US010120198B2

(12) United States Patent
Santori et al.

(10) Patent No.: US 10,120,198 B2
(45) Date of Patent: Nov. 6, 2018

(54) DIRECTIONAL BACKLIGHT

(71) Applicant: LEIA INC., Menlo Park, CA (US)

(72) Inventors: Charles M. Santori, Palo Alto, CA (US); David A. Fattal, Mountain View, CA (US); Marco Fiorentino, Mountain View, CA (US); James A. Brug, Menlo Park, CA (US); Zhen Peng, Foster City, CA (US)

(73) Assignee: LEIA INC., Menlo Park, CA (US)

( * ) Notice: Subject to any disclaimer, the term of this patent is extended or adjusted under 35 U.S.C. 154(b) by 27 days.

(21) Appl. No.: 15/253,809

(22) Filed: Aug. 31, 2016

(65) Prior Publication Data

US 2016/0370594 A1 Dec. 22, 2016

Related U.S. Application Data

(60) Division of application No. 14/309,532, filed on Jun. 19, 2014, now Pat. No. 9,459,461, and a continuation of application No. PCT/US2012/040305, filed on May 31, 2012.

(51) Int. Cl.
| | |
|---|---|
| *G02B 27/22* | (2018.01) |
| *G02B 27/14* | (2006.01) |
| *G06T 15/00* | (2011.01) |
| *F21V 8/00* | (2006.01) |
| *G02B 27/42* | (2006.01) |

(52) U.S. Cl.
CPC ........... *G02B 27/225* (2013.01); *G02B 6/003* (2013.01); *G02B 6/005* (2013.01); *G02B 6/0068* (2013.01); *G02B 27/22* (2013.01); *G02B 27/4205* (2013.01)

(58) Field of Classification Search
CPC ........ G02B 27/0172; G02B 2027/0112; G02B 2027/0118; G02B 27/2221; G02B 27/225; G02B 27/4205; G02B 6/003; G02B 6/0068; G02B 6/005; G02B 27/22; H04N 13/0422; H04N 9/3155; H04N 9/3197; H04N 13/0497; H04N 13/0282; G06T 19/20; G06T 15/00; G06T 17/00; G06T 2200/04
USPC ........ 359/462, 464, 466, 467, 242, 634, 630
See application file for complete search history.

(56) References Cited

U.S. PATENT DOCUMENTS

| 8,619,363 B1* | 12/2013 | Coleman ............... G02B 5/18 359/576 |
|---|---|---|
| 2006/0083476 A1* | 4/2006 | Winkler ............... G02B 6/0018 385/146 |
| 2010/0123952 A1* | 5/2010 | Chen ............... G02B 27/0093 359/464 |
| 2011/0141395 A1* | 6/2011 | Yashiro ............... G02B 6/0036 349/62 |

(Continued)

*Primary Examiner* — Jade R Chwasz
(74) *Attorney, Agent, or Firm* — J. Michael Johnson

(57) ABSTRACT

A directional backlight is disclosed. The directional backlight has a plurality of light sources to generate a plurality of input planar lightbeams. The plurality of input planar lightbeams illuminates a directional backplane that has a plurality of directional pixels to scatter the plurality of input planar lightbeams into a plurality of directional lightbeams. Each directional lightbeam has a direction and angular spread controlled by characteristics of a directional pixel in the plurality of directional pixels. The directional backlight can be used to generate a 3D image by specifying the characteristics of the directional pixels in the directional backplane.

15 Claims, 13 Drawing Sheets

(56) References Cited

U.S. PATENT DOCUMENTS

2012/0127573 A1*  5/2012  Robinson ............. G02B 6/0048
                                                    362/602
2012/0127751 A1*  5/2012  Kimmel ............... G02B 6/0036
                                                    362/602
2016/0033705 A1*  2/2016  Fattal .................. G02B 6/0068
                                                    349/15

* cited by examiner

DIRECTIONAL BACKLIGHT

CROSS-REFERENCE TO RELATED APPLICATIONS

This application is a divisional application of and claims the benefit of priority to parent U.S. patent application Ser. No. 14/309,532, filed Jun. 19, 2014, which is a continuation application of and claims the benefit of priority to prior International Application No. PCT/US2012/040305, filed May 31, 2012, the entire contents of both of which are incorporated herein by reference.

STATEMENT REGARDING FEDERALLY SPONSORED RESEARCH OR DEVELOPMENT

N/A

BACKGROUND

The ability to reproduce a light field in a display screen has been a key quest in imaging and display technology. A light field is the set of all light rays traveling in every direction through every point in space. Any natural, real-world scene can be fully characterized by its light field, providing information on the intensity, color, and direction of all light rays passing through the scene. The goal is to enable viewers of a display screen to experience a scene as one would experience it in person.

Currently available display screens in televisions, personal computers, laptops, and mobile devices remain largely two-dimensional and are thus not capable of accurately reproducing a light field. Three-dimensional ("3D") displays have recently emerged but suffer from inefficiencies in angular and spatial resolution in addition to providing a limited number of views. Examples include 3D displays based on holograms, parallax barriers, or lenticular lenses.

A common theme among these displays is the difficulty to fabricate displays for light fields that are controlled with precision at the pixel level in order to achieve good image quality for a wide range of viewing angles and spatial resolutions.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
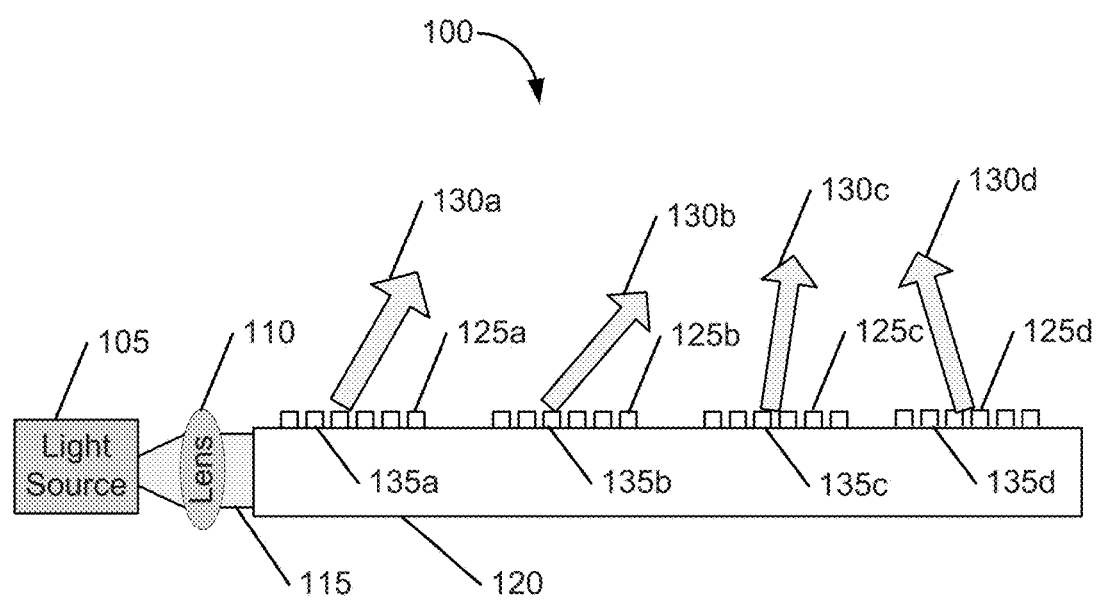
FIG. 1 illustrates a schematic diagram of a directional backlight in accordance with various embodiments.

A directional backlight is disclosed. The directional backlight uses a plurality of light sources to generate a plurality of input planar lightbeams for a directional backplane. The directional backplane is composed of a plurality of directional pixels that guide the input planar lightbeams and scatter a fraction of them into output directional lightbeams. The input planar lightbeams propagate in substantially the same plane as the directional backplane, which is designed to be substantially planar.

In various embodiments, the directional pixels in the directional backplane have patterned gratings of substantially parallel and slanted grooves arranged in or on top of the directional backplane. The directional backplane may be, for example, a slab of transparent material that guides the input planar lightbeams into the directional pixels, such as, for example, Silicon Nitride ("SiN"), glass or quartz, plastic, Indium Tin Oxide ("ITO"), among others. The patterned gratings can consist of grooves etched in the directional backplane or grooves made of material deposited on top of the directional backplane (e.g., any material that can be deposited and etched or lift-off, including any dielectrics or metal).

In various embodiments, the plurality of light sources comprises a plurality of narrow-bandwidth light sources with a spectral bandwidth of approximately 30 nm or less. For example, the narrow-bandwidth light sources may include Light Emitting Diodes ("LEDs"), lasers, and so on. The light sources may include a single-color light source, multiple single-color light sources, three color light sources (e.g., a red LED, green LED, and a blue LED), or three color LED strips, each containing an array of color LEDs (e.g., a strip of red LEDs, a strip of green LEDs, and a strip of blue LEDs).

The plurality of light sources may be arranged in different configurations with respect to the directional backplane to avoid contamination of one light color (e.g., red) into another light color (e.g., blue). In addition, the plurality of light sources may be used with a lens component (e.g., a cylindrical lens, an aspheric condenser lens combined with a cylindrical lens, a microlens, etc.) to collimate and focus the input planar lightbeams into the directional backplane. The plurality of light sources may also be used with a light baffle or absorber to improve efficiency and further focus the input planar lightbeams into the directional backplane.

As described in more detail herein below, each directional pixel in the directional backplane may be specified by a grating length (i.e., dimension along the propagation axis of the input planar lightbeams), a grating width (i.e., dimension across the propagation axis of the input planar lightbeams), a groove orientation, a pitch, and a duty cycle. Each directional pixel may emit a directional lightbeam with a direction that is determined by the groove orientation and the grating pitch and with an angular spread that is determined by the grating length and width. By using a duty cycle of or around 50%, the second Fourier coefficient of the patterned gratings vanishes thereby preventing the scattering of light in additional unwanted directions. This insures that only one directional lightbeam emerges from each directional pixel regardless of the output angle.

As further described in more detail herein below, a directional backplane can be designed with directional pixels that have a certain grating length, a grating width, a groove orientation, a pitch and a duty cycle that are selected to produce a given 3D image. The 3D image can be a red, blue, and green 3D image generated from the directional lightbeams emitted by the directional pixels in the backplane.

It is appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Referring now to FIG. 1, a schematic diagram of a directional backlight in accordance with various embodiments is described. Directional backlight 100 includes a single-color light source 105 disposed behind a lens component 110 to generate a collimated input planar lightbeam 115 for the directional backplane 120. The lens component 110 may include a cylindrical lens, an aspheric condenser lens combined with a cylindrical lens, a microlens, or any other optical combination for collimating and focusing the input planar lightbeam 115 into the directional backplane 120. The directional backplane 120 consists of a slab of a transparent material (e.g., SiN, glass or quartz, plastic, ITO, etc.) having a plurality of directional pixels 125a-d arranged in or on top of the directional backplane 120. The directional pixels 125a-d scatter a fraction of the input planar lightbeam 115 into output directional lightbeams 130a-d.

In various embodiments, each directional pixel 125a-d has patterned gratings of substantially parallel and slanted grooves, e.g., grooves 135a for directional pixel 125a. The thickness of the grating grooves can be substantially the same for all grooves resulting in a substantially planar design. The grooves can be etched in the directional backplane or be made of material deposited on top of the directional backplane 120 (e.g., any material that can be deposited and etched or lift-off, including any dielectrics or metal).

Each directional lightbeam 130a-d has a given direction and an angular spread that is determined by the patterned gratings in its corresponding directional pixel 125a-d. In particular, the direction of each directional lightbeam 130a-d is determined by the orientation and the grating pitch of the patterned gratings. The angular spread of each directional lightbeam is in turn determined by the grating length and width of the patterned gratings. For example, the direction of directional lightbeam 130a is determined by the orientation and the grating pitch of patterned gratings 135a.

It is appreciated that this substantially planar design and the formation of directional lightbeams 130a-d upon an input planar lightbeam 115 requires a grating with a substantially smaller pitch than traditional diffraction gratings. For example, traditional diffraction gratings scatter light upon illumination with lightbeams that are propagating substantially across the plane of the grating. Here, the gratings in each directional pixel 125a-d are substantially on the same plane as the input planar lightbeam 115 when generating the directional lightbeams 130a-d. This planar design enables illumination with the light source 105.

The directional lightbeams 130a-d are precisely controlled by characteristics of the gratings in directional pixels 125a-d including a grating length L, a grating width W, a groove orientation angle θ, and a grating pitch L. In particular, the grating length L of grating 135a controls the angular spread ΔΘ of the directional lightbeam 130a along the input light propagation axis and the grating width W controls the angular spread ΔΘ of the directional lightbeam 130a across the input light propagation axis, as follows:

$$\Delta\Theta \approx \frac{4\lambda}{\pi L}\left(\frac{4\lambda}{\pi W}\right) \quad \text{(Eq. 1)}$$

where λ is the wavelength of the directional lightbeam 130a. The groove orientation, specified by the grating orientation angle θ, and the grating pitch or period, specified by Λ, control the direction of the directional lightbeam 130a.

The grating length L and the grating width W can vary in size in the range of 0.1 to 200 μm. The groove orientation angle θ and the grating pitch Λ may be set to satisfy a desired direction of the directional lightbeam 130a, with, for example, the groove orientation angle θ on the order of −40 to +40 degrees and the grating pitch Λ on the order of 200-700 nm.

It is appreciated that directional backplane 120 is shown with four directional pixels 125a-d for illustration purposes only. A directional backplane in accordance with various embodiments can be designed with many directional pixels (e.g., higher than 100), depending on how the directional backplane 120 is used (e.g., in a 3D display screen, in a 3D watch, in a mobile device, etc.). It is also appreciated that the directional pixels may have any shape, including for example, a circle, an ellipse, a polygon, or other geometrical shape. Further, it is appreciated that any narrow-bandwidth light source may be used to generate the input planar lightbeam 115 (e.g., a laser or LED).

Figure 2A:
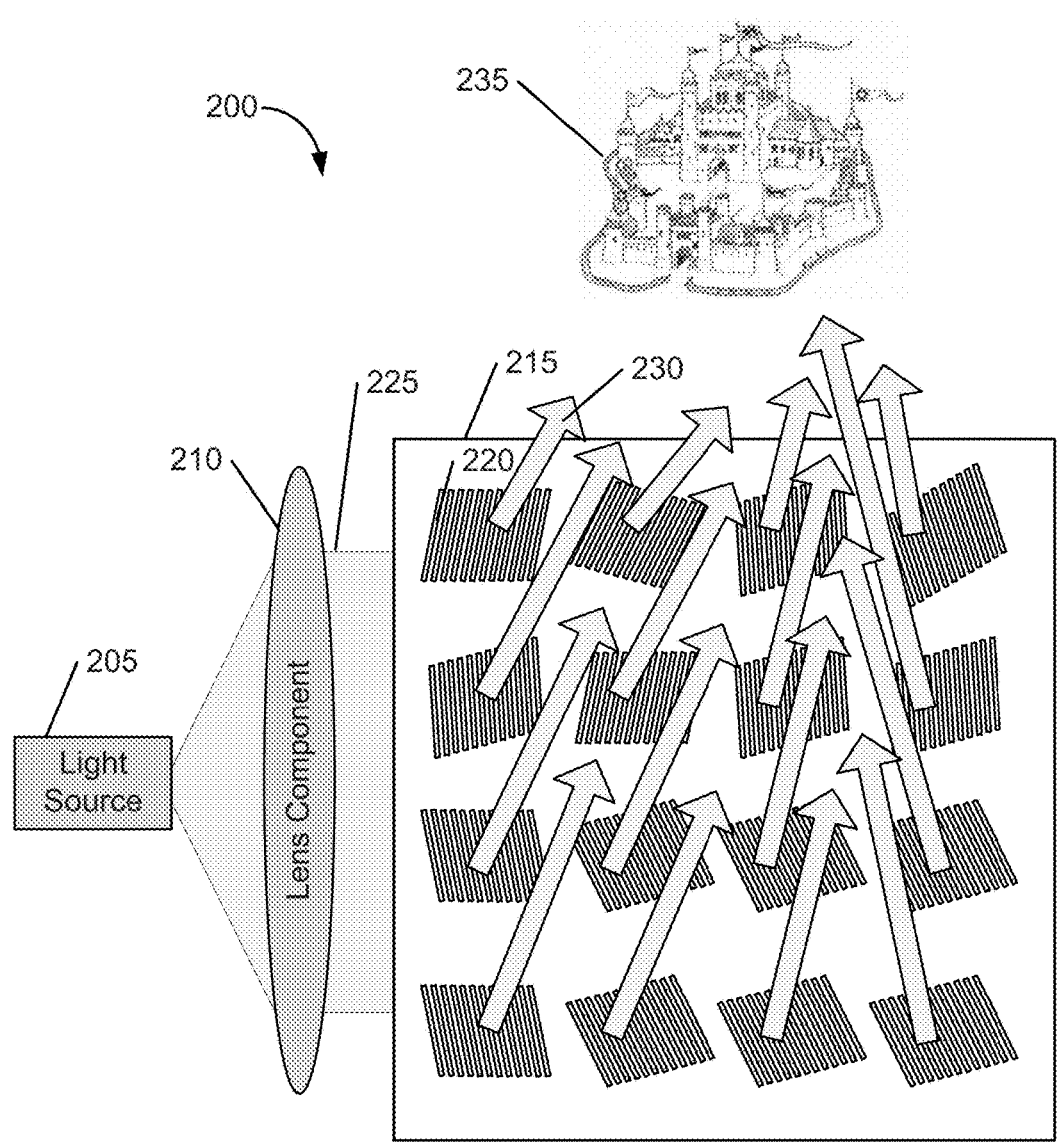
FIGS. 2A-B illustrate top views of a directional backlight according to FIG. 1.
Figure 2B:
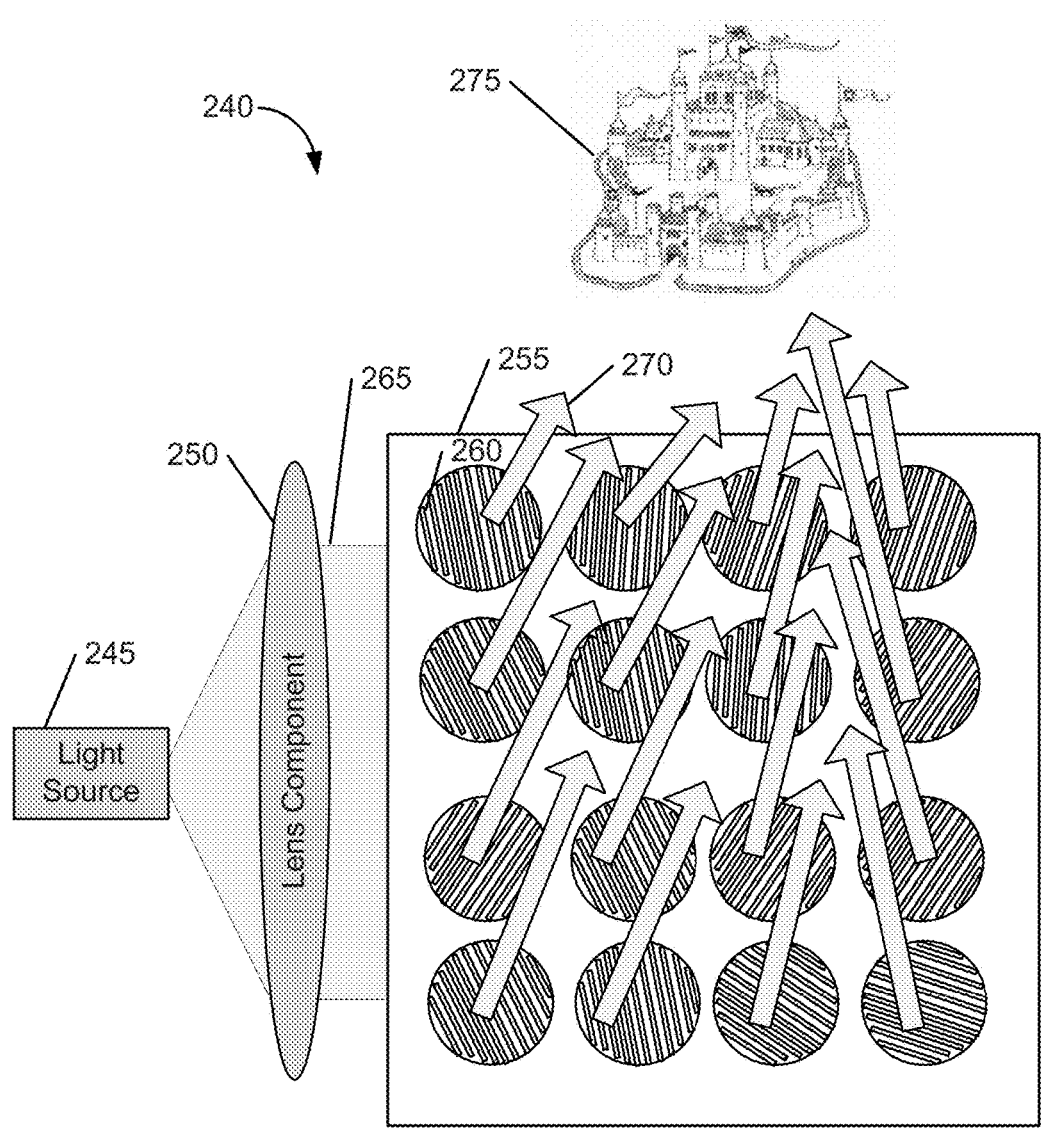

Attention is now directed to FIGS. 2A-B, which illustrate top views of a directional backlight according to FIG. 1. In FIG. 2A, directional backlight 200 is show with a single-color light source 205 (e.g., an LED), a lens component 210 and a directional backplane 215 consisting of a plurality of polygonal directional pixels (e.g., directional pixel 220) arranged in a transparent slab. Each directional pixel is able to scatter a portion of the input planar lightbeam 225 from the light source 205 into an output directional lightbeam (e.g., directional lightbeam 230). The directional lightbeams scattered by all the directional pixels in the directional backplane 215 can represent multiple image views that when combined form a 3D image, such as, for example, 3D image 235.

Similarly, in FIG. 2B, directional backlight 240 is shown with a single-color light source 245 (e.g., an LED), a lens component 250 and a directional backplane 255 consisting of a plurality of circular directional pixels (e.g., directional pixel 260) arranged in a transparent slab. Each directional pixel is able to scatter a portion of the input planar lightbeam 265 from the light source 245 into an output directional lightbeam (e.g., directional lightbeam 270). The directional lightbeams scattered by all the directional pixels in the directional backplane 255 can represent multiple image views that when combined form a 3D image, such as, for example, 3D image 275.

Figure 3:
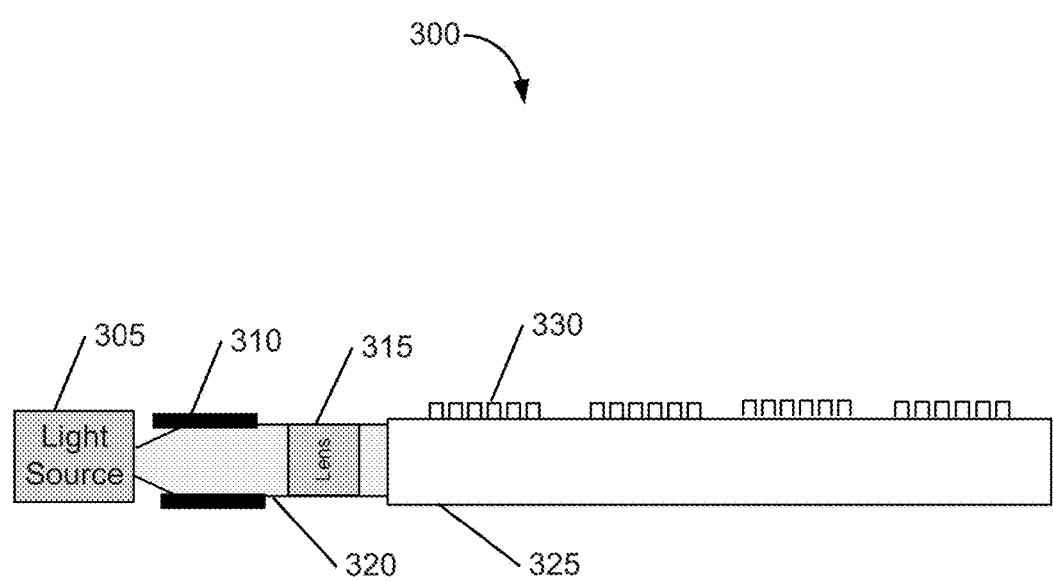
FIG. 3 illustrates a schematic diagram of a directional backlight having an optical baffle.

In various embodiments, the input planar lightbeam 225 (265) from the light source 205 (245) can be further collimated into the directional backplane 215 (255) by using a baffle or absorber that regulates the angular divergence of light from the light source 205 (245). This is illustrated in FIG. 3, which shows an optical baffle 310 in between a light source 305 and a lens component 315 in a directional backlight 300. A light pipe 320, made of a metal or dielectric material, can be used to direct the light from light source 305 into the directional backplane 325 having a plurality of directional pixels, such as, for example, directional pixel 330.

Figure 4:
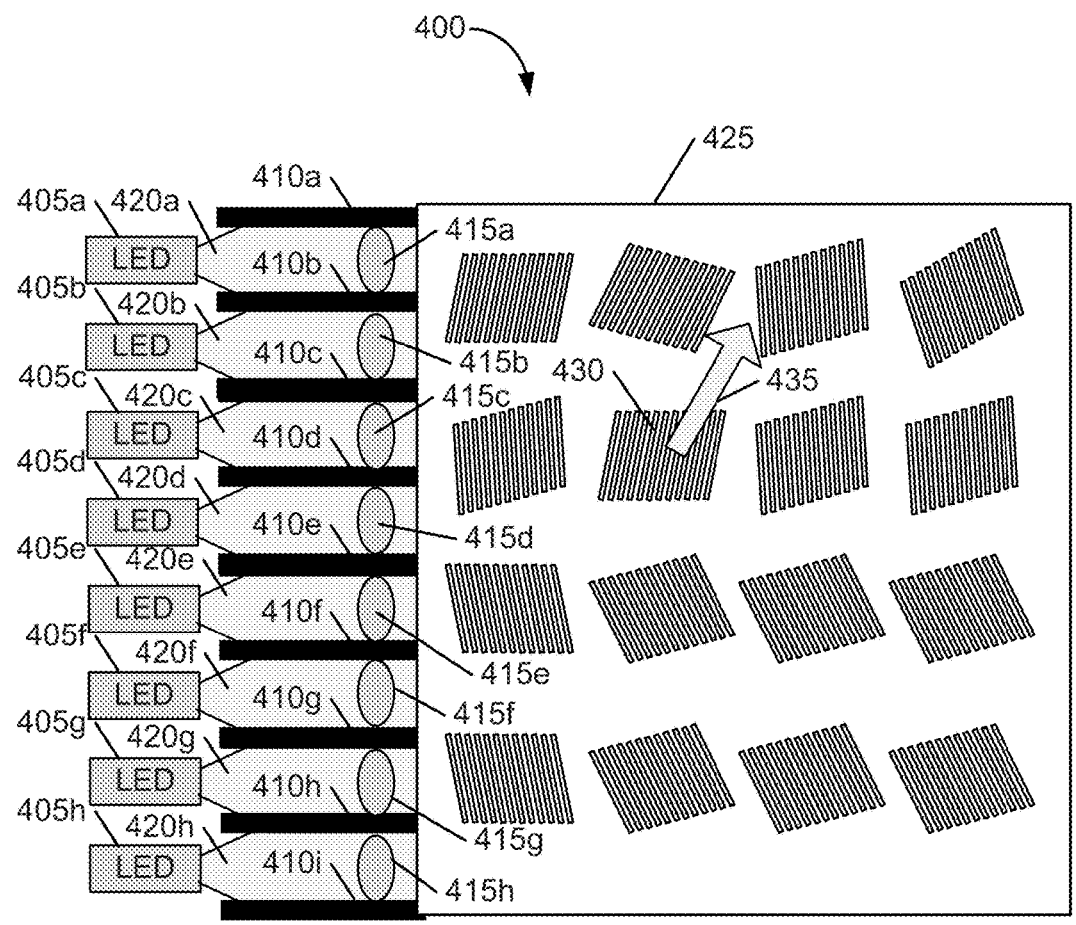
FIG. 4 illustrates a schematic diagram of a directional backlight with multiple single-color light sources.

In additional embodiments, multiple single-color light sources (e.g., lasers or LEDs) may be used to generate multiple input planar lightbeams to illuminate a directional backplane in a directional backlight. FIG. 4 illustrates the use of multiple single-color light sources in a directional backlight. Directional backlight 400 is designed with multiple single-color light sources, such as, for example, LEDs 405a-h. Optical baffles 410a-i may be used together with lens components 415a-h to focus the input planar lightbeams 420a-h into backplane 425 having a plurality of directional pixels to generate directional lightbeams (e.g., directional pixel 430 generating directional lightbeam 435).

The directional backlights 100-400 illustrated in FIGS. 1-4 are designed to work with single-color LEDs or with other single-color narrow-bandwidth light source (e.g., a laser). In various embodiments, light sources of different colors (e.g., color LEDs) may also be used. The challenge is to design a directional backlight for use with color light sources in such a way that a grating designed to scatter light of a given color (say red) in an intended view zone does not scatter light of another color (say green and blue) in that zone. In one embodiment, the color light sources are arranged in a substantially symmetrical fashion so as to form a triangle around the display and oriented towards the display center.

The directional backlight may be designed with directional pixels having a set of characteristics such as a specific grating length, grating width, orientation, pitch, and duty cycle. Each directional pixel may be designed to scatter light from a single color into a directional lightbeam. The directional lightbeams generated by all the directional pixels in the directional backplane may be modulated to produce a given red, blue, and green 3D image. In the simplest embodiment, a static 3D image (i.e. a given collection of rays) can be formed simply by suppressing the gratings corresponding to unwanted rays. One can just omit to pattern those gratings during fabrication.

Figure 5:
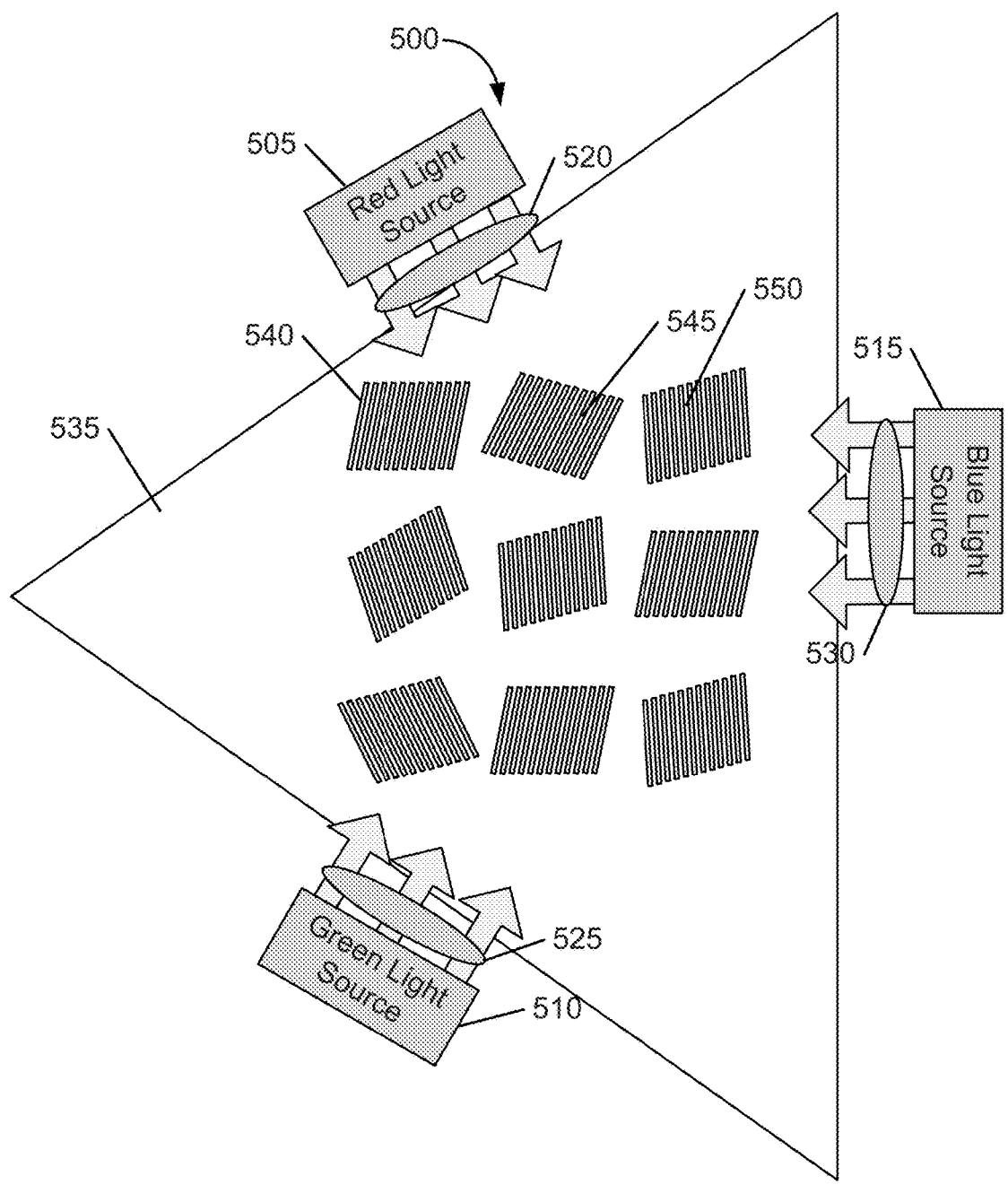
FIG. 5 illustrates a directional backlight having a triangular shape and using color light sources in accordance with various embodiments.

Referring now to FIG. 5, a directional backlight for use with color light sources in accordance with various embodiments is described. Directional backlight 500 has a red light source 505, a green light source 510, and a blue light source 515 with corresponding lens components 520, 525, and 530 (e.g., cylindrical lens, aspheric condenser lens with a cylindrical lens, microlens, etc.) arranged in a directional backplane 535 that has a triangular shape. Each of the color light sources 505-515 is disposed on a side of the triangular directional backplane 535 to focus their light on a subset of directional pixels. For example, the red light source 505 shines light in the directional backplane 535 to be scattered into red directional lightbeams by a subset of directional pixels 540-550. This subset of directional pixels 540-550 may also receive light from the green light source 510 and the blue light source 515. However, by design this light is not scattered in the intended view zone of the directional backlight 400.

Figure 6:
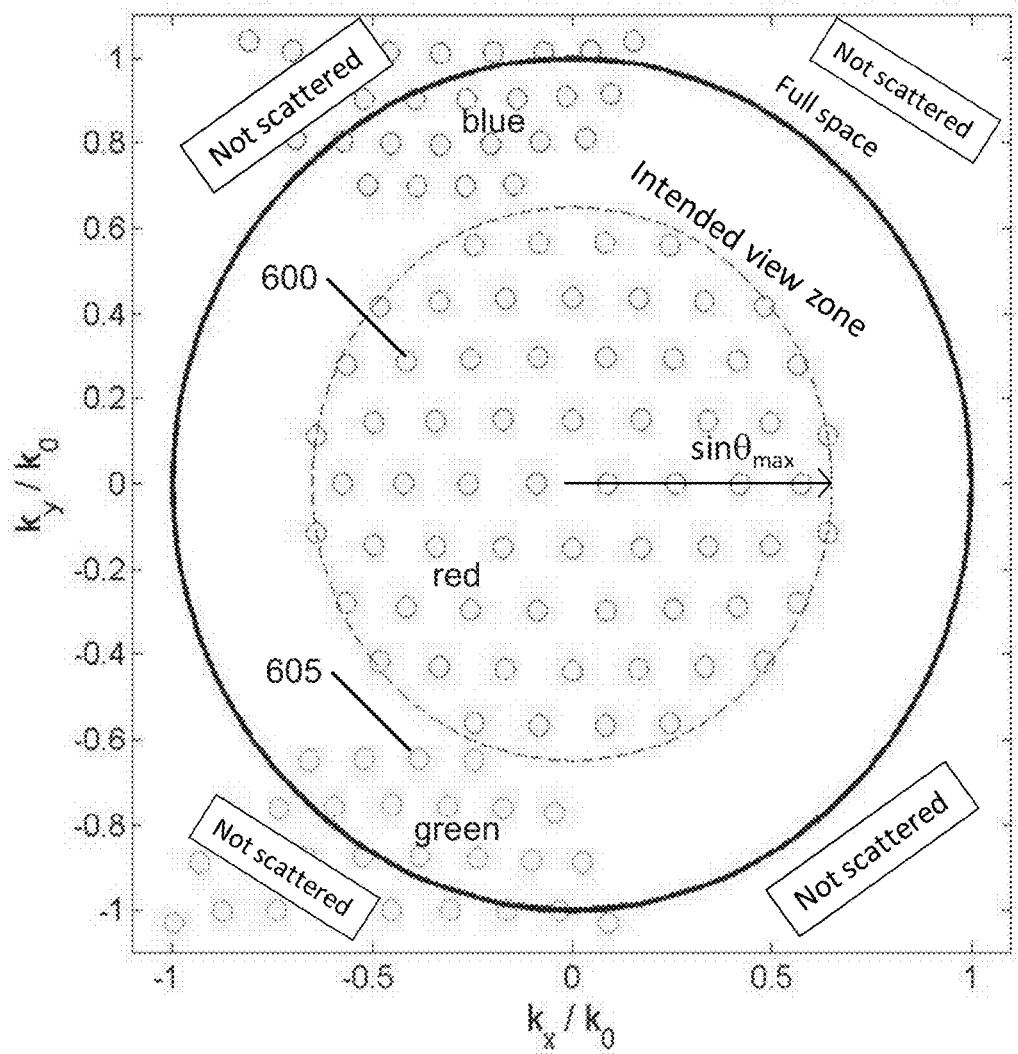
FIG. 6 illustrates a schematic diagram showing the direction of light scattered by a subset of directional pixels in a directional backlight in accordance with various embodiments.

For example, FIG. 6 illustrates a schematic diagram showing the direction of light scattered by a subset of directional pixels in a directional backlight in accordance with various embodiments. Light coming from an LED A (e.g., a red LED, not shown) is scattered by a subset $G_A$ of directional pixels 600 into an intended view zone, specified by a maximum ray angle $\theta_{max}$ measured from a normal to the directional backlight. It is appreciated that the intended view zone is the same for all colors.

It is also appreciated that light from LED A may also be scattered by a subset of directional pixels $G_B$ 605, however those unwanted rays are outside the intended view zone as long as:

$$\sin\theta_{max} \leq \frac{\lambda_A + \lambda_B}{\lambda_A \lambda_B} \sqrt{\left(\frac{n_{eff}^A}{\lambda_A}\right)^2 + \left(\frac{n_{eff}^B}{\lambda_B}\right)^2 - \left(\frac{n_{eff}^A}{\lambda_A}\right)\left(\frac{n_{eff}^B}{\lambda_B}\right)} \quad \text{(Eq. 2)}$$

where $\lambda_A$ is the wavelength of LED A, $n_{eff}^A$ is the effective index of horizontal propagation of light A in the directional backplane, $\lambda_B$ is the wavelength of LED B (e.g., a green LED, not shown), and $n_{eff}^B$ is the effective index of horizontal propagation of light B in the directional backplane. In case where the effective indices and wavelengths are substantially the same, Equation 2 reduces to:

$$\sin\theta_{max} \leq \frac{n_{eff}}{2} \quad \text{(Eq. 3)}$$

For a directional backplane of refractive index n above 2 with LED light propagating near the grazing angle, it is seen that the intended view zone of the display can be extended to the whole space ($n_{eff} \geq 2$ and $\sin\theta_{max} \sim 1$). For a directional backplane of lower index such as glass (e.g., n=1.46), the intended view zone is limited to about $\theta_{max} < \arcsin(n/2)$ (±45° for glass).

One skilled in the art would appreciate that the red, blue, and green 3D image may have other colors present if a given color directional lightbeam scatters light into the same direction as a directional lightbeam from another color. Since precise directional and angular control can be achieved with each directional pixel, the directional backlight can be designed to generate many variations of 3D images.

Figure 7:
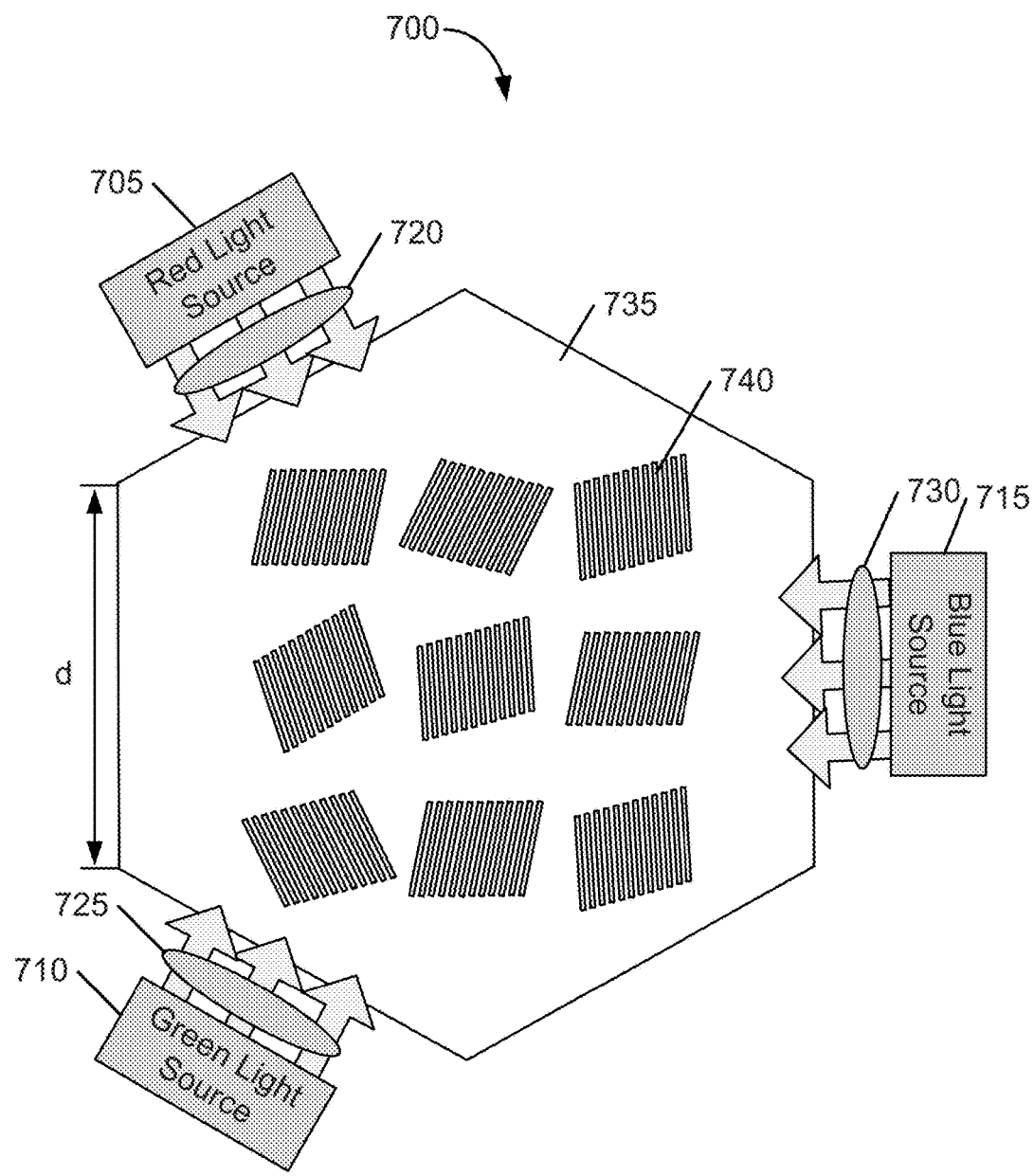
FIG. 7 illustrates a directional backlight having an hexagonal shape and using color light sources.

It is further appreciated that the directional backplane 535 shown in FIG. 5 may be shaped into a more compact design by realizing that the extremities of the triangular slab can be cut to form a hexagonal shape, as shown in FIG. 7. Directional backlight 700 has a red light source 705, a green light source 710, and a blue light source 715 with corresponding lens components 720, 725, and 730 (e.g., cylindrical lens, aspheric condenser lens with a cylindrical lens, microlens, etc.) arranged in a directional backplane 735 that has a hexagonal shape. Each of the color light sources 705-715 is disposed on alternating sides of the hexagonal directional backplane 735 to focus its light on a subset of directional pixels (e.g., directional pixel 740). In one embodiment, the hexagonal directional backplane 735 has a side length that may range in the order of 10-30 mm, with a directional pixel size in the order of 10-30 μm.

Figure 8:
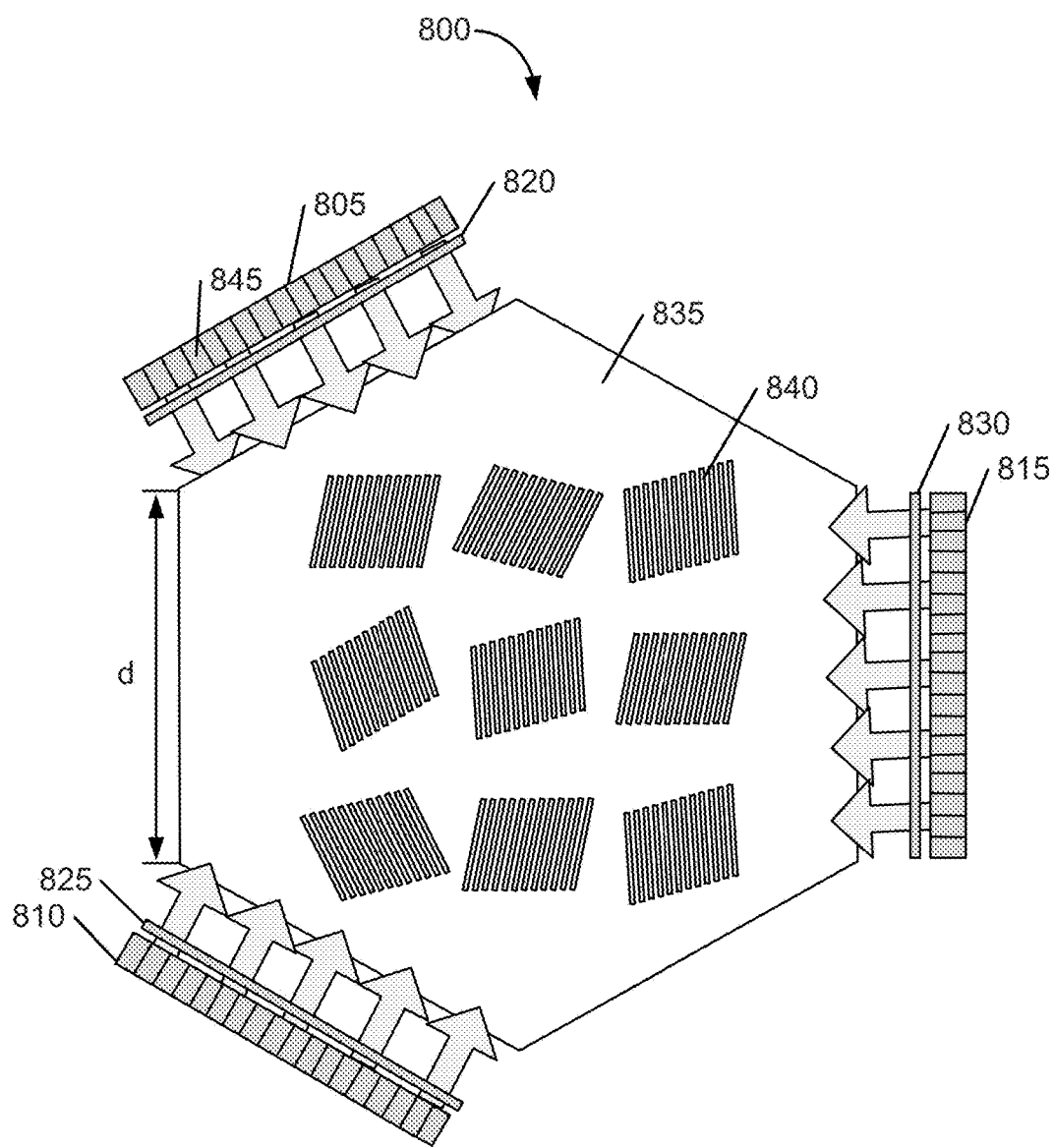
FIG. 8 illustrates a directional backlight having an hexagonal shape and using color LED strips.

In various embodiments, each color light source may be replaced by an LED strip. FIG. 8 illustrates a hexagonal directional backlight with color LED strips. Directional backlight 800 has a red LED strip 805, a green LED strip 810, and a blue LED strip 815 arranged in a directional backplane 835 that has a hexagonal shape. Each of the color LED strips 805-815 is disposed on a side of the hexagonal directional backplane 835 to focus its light on a subset of directional pixels (e.g., directional pixel 840). In one embodiment, the hexagonal directional backplane 835 may have a side length of 20 mm and each LED strip may have 20 LEDs of 1 mm each, e.g., LED 845 in red LED strip 805. Each LED strip 805-815 may also be disposed behind an array of microlenses 820-830. The arrays of microlenses may also be integrated with the LED strips in a single component.

Figure 9:
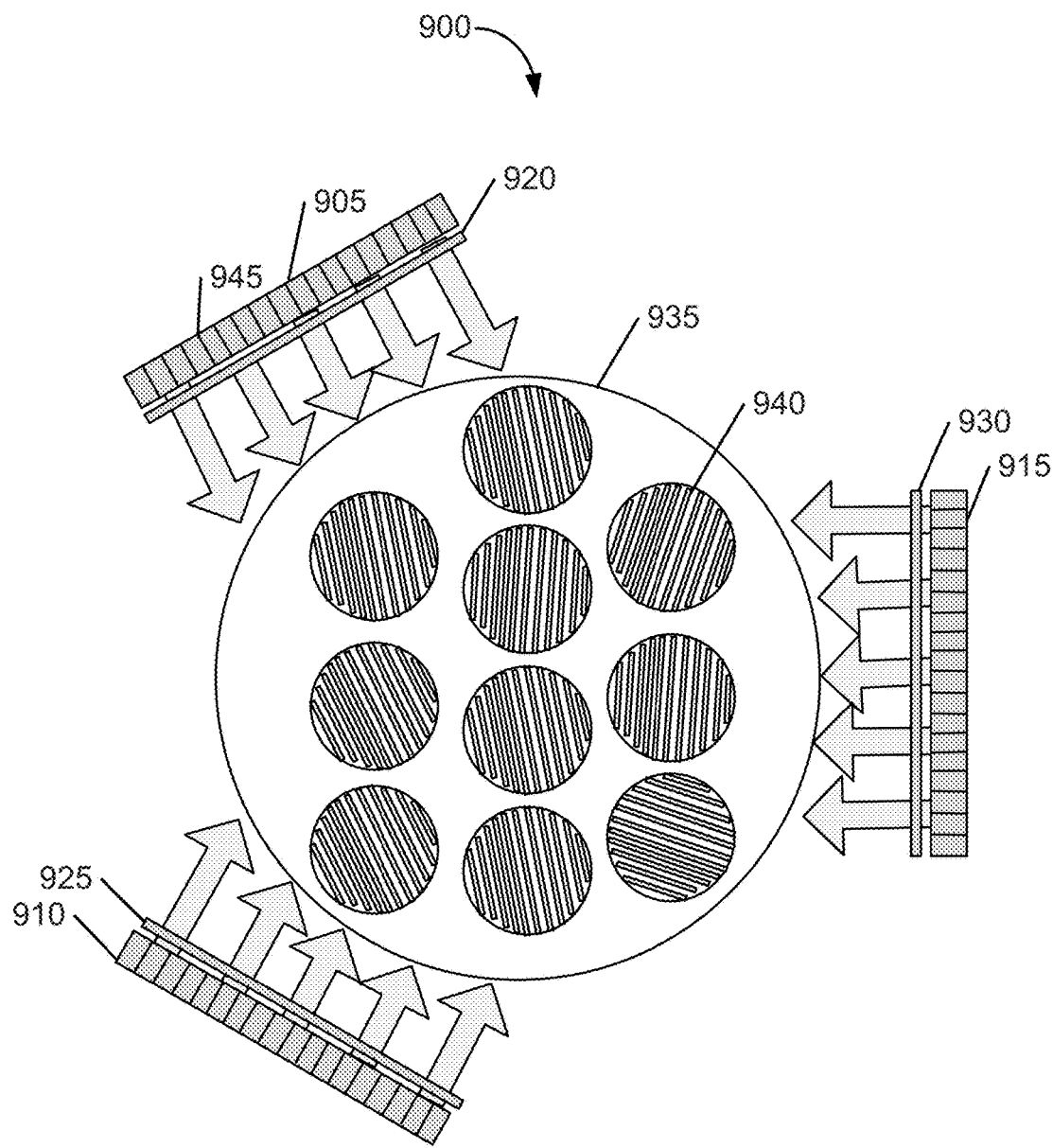
FIG. 9 illustrates a directional backlight having a circular shape and using color LED strips.

It is appreciated that the directional backlight for use with color LEDs (e.g., directional backlight 500 in FIG. 5, directional backlight 700 in FIG. 7 and directional backlight 800 in FIG. 8) can have any geometrical shape besides a triangular or hexagonal shape as long as light from three primary colors is brought from three different directions. For example, the directional backlight may be a polygon, a circle, an ellipse, or another shape able to receive light from three different directions. FIG. 9 illustrates a circular directional backlight having light coming from three color LED strips 905-915 positioned in three different directions with respect to a circular directional backplane 935. The directional backplane 935 is shown with circular directional pixels (e.g., pixel 940), but as appreciated by one skilled in the art, the directional pixels can also take another geometrical shape, e.g., a polygon, an ellipse, and so on.

Figure 10:
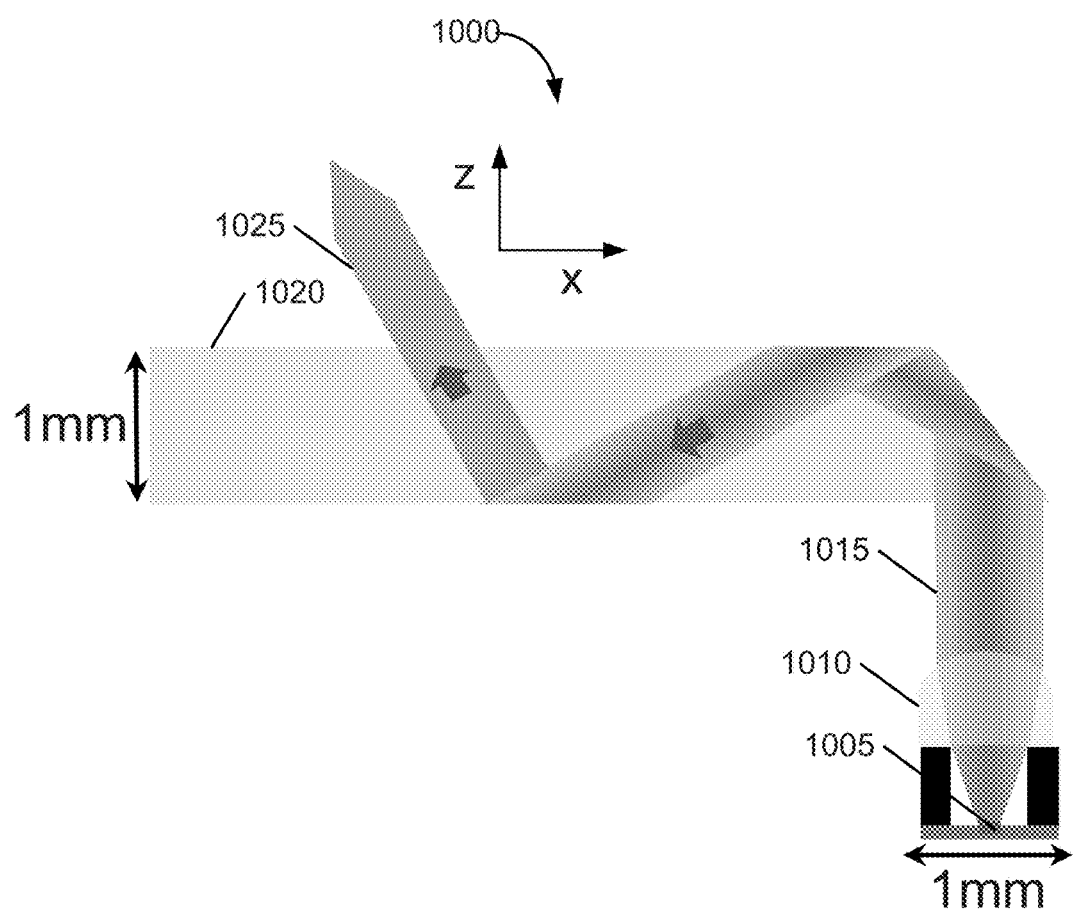
FIG. 10 illustrates a side view of the directional backlight of FIG. 8.

FIG. 10 illustrates a side view of a directional backlight having color LED strips. Directional backlight 1000 is shown with one color LED 1005 from its color LED strip. A microlens 1010 is disposed in front of the LED 1005 to focus the light into a directional backplane made out of a thin transparent material. A planar input lightbeam 1015 incident into the directional backplane 1020 is internally reflected in the directional backplane 1020 and scattered into a directional lightbeam 1025 by directional pixels (not shown) disposed thereon.

Figure 11:
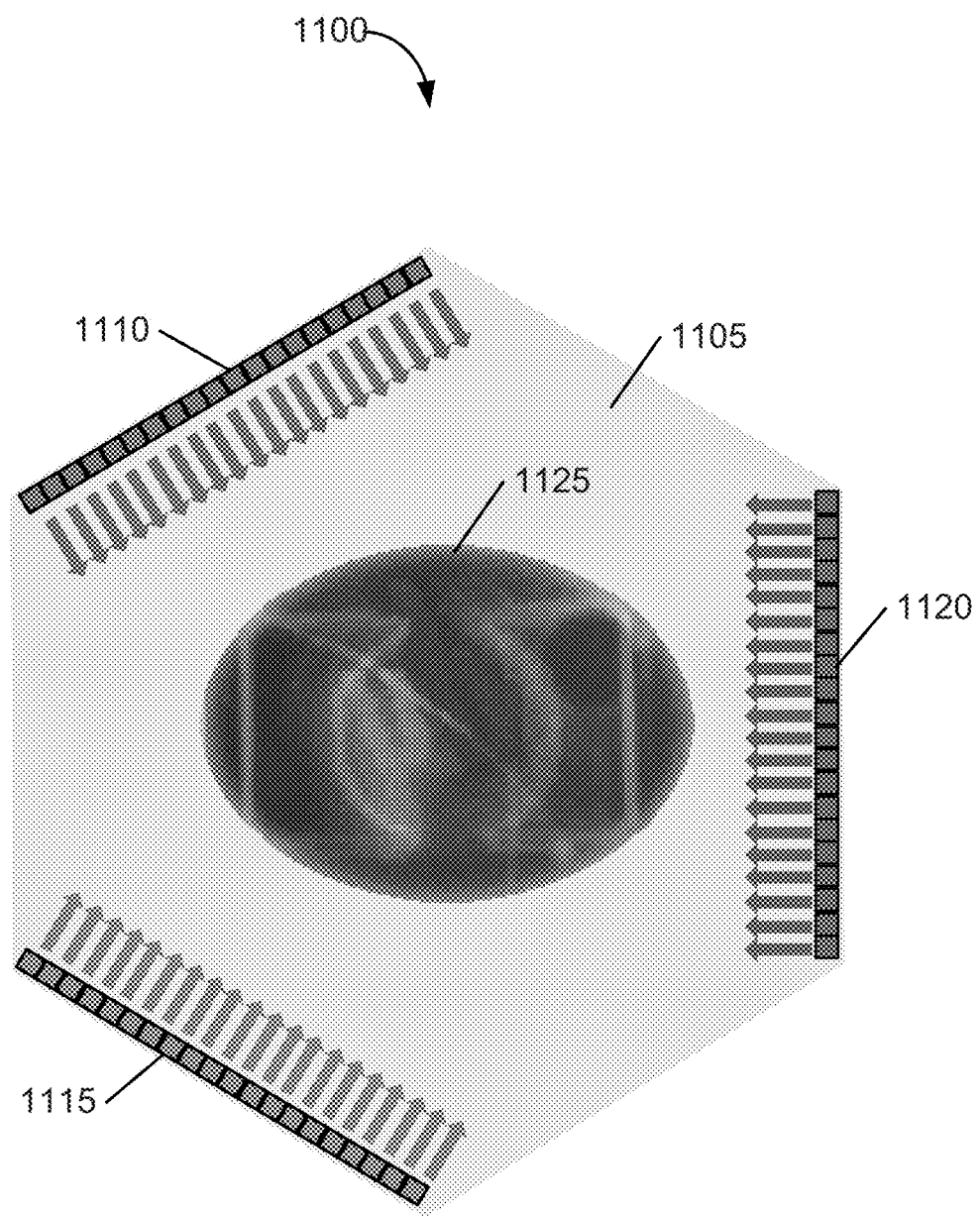
FIG. 11 illustrates a 3D image formed by a directional backlight in accordance with various embodiments.

Depending on how each directional pixel in the directional backplane 1020 is configured, i.e., with a given grating length, grating width, orientation, pitch, and duty cycle, the directional lightbeams (e.g., directional lightbeam 1015) form a given 3D image. For example, FIG. 11 illustrates a directional backlight and the 3D image it produces in accordance with various embodiments. Directional backlight 1100 has a directional backplane 1105 with a hexagonal shape and with color LED strips 1110-1120 disposed on three of its sides. As described in more detail above, the color LED strips 1110-1120 are spaced apart (i.e., by a side of the hexagon) to prevent contamination from one color into the other when they are scattered by the directional pixels (not shown) disposed in the directional backplane 1105. Each directional pixel is configured to generate a directional lightbeam of a given color and having a given direction and angular spread. The directional lightbeams generated by the directional pixels in the directional backplane 1105 combine to form a 3D image 1125.

Figure 12:
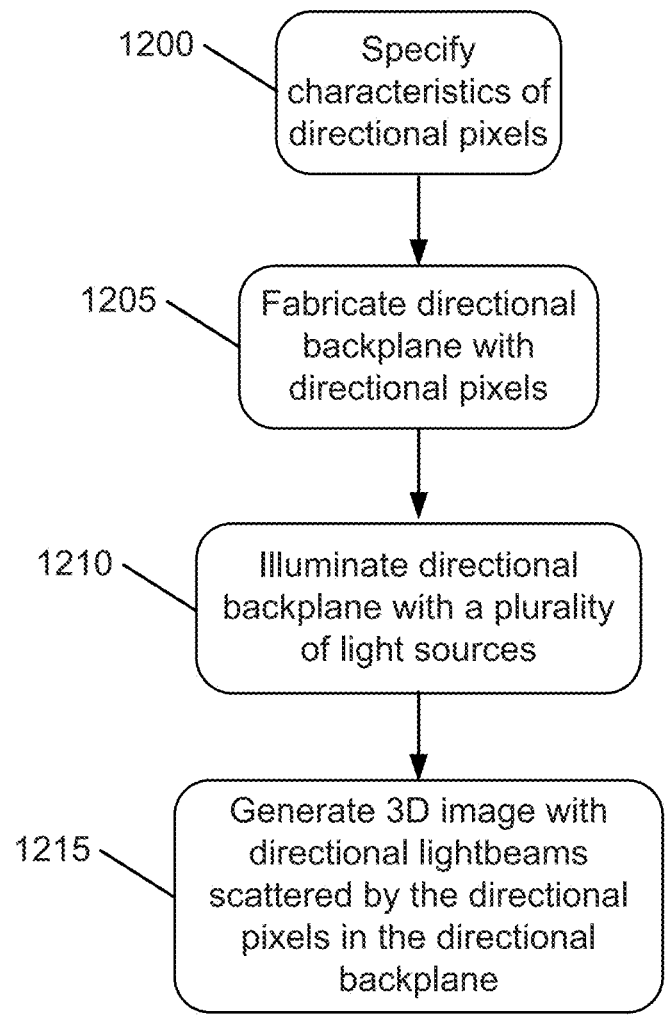
FIG. 12 is a flowchart for generating a 3D image with a directional backlight in accordance with various embodiments.

A flowchart for generating a 3D image with a directional backlight in accordance with various embodiments is illustrated in FIG. 12. First, the characteristics of the directional pixels of the directional backlight are specified (1200). The characteristics may include characteristics of the patterned gratings in the directional pixels, such as, for example, a grating length, a grating width, an orientation, a pitch, and a duty cycle. As described above, each directional pixel in the directional backlight can be specified with a given set of characteristics to generate a directional lightbeam having a direction and an angular spread that is precisely controlled according to the characteristics. Next, a directional backplane with directional pixels is fabricated (1205). The directional backplane is made of a transparent material and may be fabricated with any suitable fabrication technique, such as, for example, optical lithography, nano-imprint lithography, roll-to-roll imprint lithography, direct embossing with an imprint mold, among others. The directional pixels may be etched in the directional backplane or be made of patterned gratings with material deposited on top of the directional backplane (e.g., any material that can be deposited and etched or lift-off, including any dielectrics or metal).

Light from a plurality of light sources (e.g., a single-color light source as in FIG. 1-3, multiple single-color light sources as in FIG. 4, three color light sources as in FIGS. 5 and 7, three LED strips as in FIGS. 8-11, and so on) is input into the directional backplane in the form of input planar lightbeams (1210). Lastly, a 3D image is generated from the directional lightbeams that are scattered by the directional pixels in the directional backplane (1215).

Advantageously, the precise control that is achieved with the directional pixels in the directional backlight enables a 3D image to be generated with an easy to fabricate substantially planar structure. Different configurations of directional pixels generate different 3D images. In addition, the color light sources can be controlled to produce any desired color effect in the generated images. The directional backlights described herein can be used to provide 3D images in display screens (e.g., in TVs, mobile devices, tablets, video game devices, and so on) as well as in other applications, such as, for example, 3D watches, 3D art devices, 3D medical devices, among others.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

This application incorporates by reference herein related PCT Patent Application Serial No. PCT/US2012/035573, entitled "Directional Pixel for Use in a Display Screen," filed on Apr. 27, 2012, which is assigned to the assignee of the present application.

What is claimed is:

1. A method of scattering input lightbeams as directional lightbeams with a directional backlight comprising:
   generating a plurality of planar lightbeams from a plurality of light sources;
   inputting the plurality of planar lightbeams into a directional backplane of the directional backlight, the directional backplane having a plurality of directional pixels, each directional pixel having characteristics to control light scattering; and
   scattering the plurality of input planar lightbeams into a plurality of directional lightbeams out of the directional backplane using the plurality of directional pixels, wherein scattering the plurality of input planar lightbeams comprises controlling a direction and an angular spread of each respective directional lightbeam using the characteristics of a respective directional pixel in the plurality of directional pixels, wherein an input planar lightbeam from a single one of the light sources is scattered into at least two different directional lightbeams of the directional lightbeam plurality, the at least two different directional lightbeams having different angular directions from one another.

2. The method of scattering input lightbeams as directional lightbeams of claim 1, wherein the light sources of the plurality of light sources are color light sources, and wherein the input planar lightbeam from a single one of the light sources is a planar lightbeam of a single color.

3. The method of scattering input lightbeams as directional lightbeams of claim 1, wherein the at least two different directional lightbeams having different angular directions from one another correspond to different views of a three-dimensional image.

4. The method of scattering input lightbeams as directional lightbeams of claim 1, wherein scattering the plurality of input planar lightbeams further comprises using diffractive scattering, each directional pixel comprising a diffraction grating arranged at a surface of the directional backplane, the light scattering control characteristics of the directional pixel comprising pattern characteristics of the diffraction grating.

5. The method of scattering input lightbeams as directional lightbeams of claim 4, wherein a pattern of the diffraction grating comprises a plurality of substantially parallel and slanted grooves.

6. The method of scattering input lightbeams as directional lightbeams of claim 4, wherein the pattern characteristics of the diffraction grating comprise a grating pitch and a grating orientation configured to control the direction of the directional lightbeam scattered by the directional pixel.

7. The method of scattering input lightbeams as directional lightbeams of claim 4, wherein the pattern characteristics of the diffraction grating comprise a grating length and a grating width configured to control the angular spread of the directional lightbeam scattered by the directional pixel.

8. The method of scattering input lightbeams as directional lightbeams of claim 1, further comprising collimating and focusing the input planar lightbeams into the directional backplane using a lens component disposed between the plurality of light sources and the directional backplane.

9. The method of scattering input lightbeams as directional lightbeams of claim 1, wherein the plurality of directional lightbeams from the directional backplane represent multiple image views that combine to form a three-dimensional image, the different angular directions of the at least two different directional lightbeams corresponding to different ones of the multiple image views.

10. A method of generating a three-dimensional (3D) image with a directional backlight comprising:

illuminating a directional backplane having a plurality of directional pixels arranged thereon with light from a plurality of color light sources, the light being a plurality of input planar lightbeams, the directional pixels comprising patterned gratings having substantially parallel and slanted grooves;

scattering the plurality of input planar lightbeams out of the directional backplane as a plurality of directional lightbeams using the plurality of directional pixels, each directional lightbeam having a direction and an angular spread controlled by characteristics of the patterned gratings; and generating the 3D image with the plurality of directional lightbeams, wherein the directional pixels are configured to scatter light of a single color in an input planar lightbeam from a single one of the color light sources of the plurality of color light sources into at least two different directional lightbeams of the directional lightbeam plurality, the at least two different directional lightbeams having different angular directions from one another corresponding to different views of the 3D image.

11. The method of generating a three-dimensional (3D) image with a directional backlight of claim 10, wherein the characteristics of the patterned gratings comprise a grating pitch and a grating orientation configured to control the directions of the directional lightbeams scattered by the directional pixels.

12. The method of generating a three-dimensional (3D) image with a directional backlight of claim 10, wherein the characteristics of the patterned gratings comprise a grating length and a grating width configured to control the angular spread of the directional lightbeams scattered by the directional pixels.

13. The method of generating a three-dimensional (3D) image with a directional backlight of claim 10, further comprising generating the plurality of planar lightbeams of light from the plurality of color light sources, and wherein illuminating a directional backplane comprises collimating and focusing the input planar lightbeams using a lens component disposed between the plurality of color light sources and the directional backplane.

14. The method of generating a three-dimensional (3D) image with a directional backlight of claim 10, wherein the directional backplane comprises a triangular directional backplane.

15. The method of generating a three-dimensional (3D) image with a directional backlight of claim 10, wherein the directional backplane comprises a hexagonal directional backplane and each color light source is disposed on alternating sides of the hexagonal directional backplane.

* * * * *